United States Patent [19]
Bard et al.

[11] Patent Number: 5,866,894
[45] Date of Patent: Feb. 2, 1999

[54] ELECTRO-OPTICAL SCANNER MODULE HAVING OSCILLATING LENS

[75] Inventors: Simon Bard, Stony Brook; Askold Strat, Patahague; Paul Dvorkis, Stony Brook, all of N.Y.

[73] Assignee: Symbol Technologies, Inc., Holtsville, Ky.

[21] Appl. No.: 820,314

[22] Filed: Mar. 18, 1997

Related U.S. Application Data

[62] Division of Ser. No. 589,350, Jan. 22, 1996, Pat. No. 5,665,954, which is a division of Ser. No. 302,071, Sep. 6, 1994, Pat. No. 5,486,944, which is a continuation-in-part of Ser. No. 981,448, Nov. 25, 1992, Pat. No. 5,478,997, which is a continuation-in-part of Ser. No. 897,835, Jun. 12, 1992, abandoned, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.[6] .................................................. G06K 7/10
[52] U.S. Cl. ........................ 235/462; 235/472; 235/454
[58] Field of Search .................... 235/462, 472, 235/454

[56] References Cited

U.S. PATENT DOCUMENTS

| | | | |
|---|---|---|---|
| 2,039,406 | 5/1936 | Greensfelder | 235/462 |
| 3,585,366 | 6/1971 | Kern | 235/462 |
| 3,729,618 | 4/1973 | Drew et al. | 235/467 |
| 3,781,078 | 12/1973 | Wildhaber | 330/6 |
| 3,866,056 | 2/1975 | Minniear et al. | 250/566 |
| 4,251,798 | 2/1981 | Swartz et al. | 235/472 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,410,235 | 10/1983 | Klement et al. | 350/96.18 |
| 4,436,260 | 3/1984 | Donelan | 244/31.6 |
| 4,578,571 | 3/1986 | Williams | 235/472 |
| 4,766,297 | 8/1988 | McMillan | 235/455 |
| 4,838,632 | 6/1989 | Manian | 350/691 |
| 4,902,083 | 2/1990 | Wells | 350/6.6 |
| 4,999,617 | 3/1991 | Uemura et al. | 340/706 |
| 5,099,110 | 3/1992 | Shepard et al. | 235/472 |
| 5,144,120 | 9/1992 | Krichever et al. | 235/462 |
| 5,168,149 | 12/1992 | Dvorkis et al. | 235/462 |
| 5,170,277 | 12/1992 | Bard et al. | 235/462 |
| 5,250,790 | 10/1993 | Metlitsky et al. | 235/462 |
| 5,254,844 | 10/1993 | Krichever et al. | 235/462 |
| 5,306,900 | 4/1994 | Metlitsky et al. | 235/462 |
| 5,367,152 | 11/1994 | Krichever et al. | 235/462 |
| 5,371,347 | 12/1994 | Plesko | 235/472 |
| 5,374,817 | 12/1994 | Bard et al. | 235/462 |
| 5,410,140 | 4/1995 | Bard et al. | 235/462 |
| 5,410,948 | 5/1995 | Eickmeyer | 99/335 |
| 5,412,193 | 5/1995 | Swartz et al. | 235/383 |
| 5,412,198 | 5/1995 | Dvorkis | 235/462 |
| 5,471,042 | 11/1995 | Kirkeby et al. | 235/472 |
| 5,479,002 | 12/1995 | Heiman et al. | 235/472 |
| 5,486,944 | 1/1996 | Bard et al. | 235/462 |
| 5,514,861 | 5/1996 | Swartz et al. | 235/472 |
| 5,525,791 | 6/1996 | Krichever et al. | 235/472 |
| 5,536,925 | 7/1996 | Bard et al. | 235/462 |
| 5,565,671 | 10/1996 | Kirkeby et al. | 235/472 |
| 5,577,881 | 11/1996 | Bard et al. | 235/472 |
| 5,583,332 | 12/1996 | Krichever et al. | 235/462 |

*Primary Examiner*—Anita Pellman Gross
*Assistant Examiner*—Douglas X. Rodriguez
*Attorney, Agent, or Firm*—Kirschstein, et al.

[57] ABSTRACT

An optical scanner module for directing a light beam to scan an optically encoded symbol includes an optical element mounted for oscillatory motion to scan the light beam in one direction by a flex element capable of torsional flexure. This oscillatory motion is induced by the interacting magnetic fields established by a permanent magnet mounted to the flex element and an electromagnetic coil driven by an AC current. Bidirectional light beam scanning is achieved by mounting an assembly of the flex element, optical element and permanent magnet to one or more additional flex elements for oscillatory motion to scan the light beam in a second direction. This oscillatory motion is induced by the inclusion of an additional permanent magnet and/or electromagnetic coil.

12 Claims, 2 Drawing Sheets

ELECTRO-OPTICAL SCANNER MODULE HAVING OSCILLATING LENS

REFERENCE TO RELATED APPLICATIONS

This application is a division of U.S. patent application Ser. No. 08/589,350, filed Jan. 22, 1996, now U.S. Pat. No. 5,665,954 which is a division of U.S. patent application Ser. No. 08/302,071, filed Sep. 6, 1994 now U.S. Pat. No. 5,486,944, which is a continuation in part of U.S. patent application Ser. No. 981,448, now U.S. Pat. No. 5,478,997 filed Nov. 25, 1992, which is a continuation-in-part of U.S. patent application Ser. No. 897,835, filed Jun. 12, 1992, now abandoned which is a continuation-in-part of U.S. patent application Ser. No. 506,674, filed Apr. 9, 1990, now abandoned which in turn is a continuation of Ser. No. 260,692, filed Oct. 21, 1988, now U.S. Pat. No. 4,933,538. This application is also related to U.S. patent application Ser. No. 562,130, filed Aug. 3, 1990, and U.S. patent application Ser. No. 553,559, filed Jul. 16, 1990. This application is further related to U.S. patent applications Ser. No. 790,627, filed Nov. 12, 1991, which is a divisional of said Ser. No. 562,130; Ser. No. 635,431, filed Dec. 28, 1990; and Ser. No. 715,267, filed Jun. 14, 1991, all of said applications being assigned to Symbol Technologies.

BACKGROUND OF THE INVENTION

A. Field of the Invention

The present invention relates to scanning systems which "read" indicia, for example, barcode symbols, having parts with different light reflectivities and, in particular, to a scanner module for directing a beam of light in a predetermined scanning pattern at a barcode symbol and directing light reflected from the barcode symbol to an optical detector.

B. Discussion of the Related Art

Various optical readers and optical scanning systems have previously been developed for reading barcode symbols appearing on a label, or on the surface of an article. The barcode symbol itself is a coded pattern of indicia. Generally, scanning systems electro-optically transform the graphic indicia of the symbols into electrical signals which are decoded into alphanumeric characters. The resulting characters describe the article and/or some characteristic of the article to which the symbol-is attached. Such characters typically comprise input data to a data processing system for applications in point-of-sale processing, inventory control, and the like.

As used in this specification and in the following claims, the terms "symbol," "barcode," and "barcode symbol" are used to denote a pattern of variable-width bars separated by variable-width spaces. The foregoing terms are intended to be broadly construed to cover many specific forms of one- and two-dimensional patterns including alphanumeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a des red sequence of characters, a collection of element arrangements are concatenated to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in U.S. patent application Ser. No. 07/461,881 filed Jan. 5, 1990, commonly assigned to the assignee of the present invention, and hereby incorporated by reference.

Scanning systems have been disclosed, for example, in U.S. Pat. Nos. 4,251,798; 4,369,361; 4,387,297; 4,409,470; 4,760,248; 4,896,026, all of which have been assigned to the assignee of the present invention. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered from the symbol. The photodetector or sensor is positioned in the scanner in an optical path so that it has a field of view which extends at least across and slightly beyond the boundaries of the symbol. A portion of the light beam reflected from the symbol is detected and converted into an analog electrical signal. The pulse-width modulated digitized signal from the digitizer is decoded, based upon the specific symbology used for the symbol, into a binary data representation of the data encoded in the symbol. The binary data may then be subsequently decoded into the alphanumeric characters represented by the symbol.

Overall performance of a scanning system in reading symbols is a function of the optical capabilities of the scanning mechanism in directing a light beam at a target symbol and resolving the reflected light, and a function of the electronic subsystems which convert and process the information contained in the reflected light. A measure of the overall performance of a barcode symbol scanning system is its ability to resolve the narrowest elements of a barcode symbol and its ability to decode symbols located perhaps hundreds of inches away from the scanning system.

An important component of any scanning system is the scanner module which directs a well-defined light beam in a predetermined beam pattern at the barcode symbol and directs the reflected light from the barcode symbol to a suitable photodetector. The beam pattern that scans the barcode symbol can take a variety of forms, such as repeated line scan, standard raster scan, jittered raster scan, fishbone, petal, etc. These beam patterns are generated by controlled motions of one or more optical elements in the beam path. Typically, the optical element includes a mirror that is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a barcode symbol can be scanned in a given time period, the chances of obtaining a valid read of the barcode symbol are increased. This is particularly important when the barcode symbols are borne by moving objects, such as packages travelling on a conveyor belt.

Many applications call for a handheld scanning system, where a user aims a light beam at the barcode symbol, and the beam executes a scan pattern to read the barcode symbol. For such applications, the scanner module must be compact in order to be accommodated in a handheld package which may be pistol-shaped. Moreover, such scanners must be lightweight and structurally robust to withstand physical shock resulting from rough handling. It is also desirable that the scanner module consume minimal power during operation.

SUMMARY OF THE INVENTION

It is accordingly an object of the present invention to provide an improved optical scanner module for utilization in a scanning system for reading a data-encoded symbol. The optical scanner of the present invention is compact, lightweight, durable and efficient in construct and operation, and thus is ideally suited for portable handheld applications.

Thus, in accordance with the present invention, an optical element and a permanent magnet are mounted to an elongated flex element which, in turn, is mounted to position the optical element in the optical path of a light beam aimed at the data-encoded symbol. An electromagnetic coil, to which scanning control signals in the form of AC drive current is applied, produces a magnetic field to interact with the magnetic field of the permanent magnet to cause flexure of the flex element and thus controlled oscillatory beam scanning motion of the optical element in one direction.

To produce bidirectional scanning motion of the optical element, the flex element, permanent magnet, and optical element assembly is, in turn, mounted by at least one additional flex element to accommodate oscillatory motion of the assembly in a second direction, preferably orthogonal to the one direction. In accordance with the present invention, bidirectional oscillatory motion of the optical element is induced by the interaction of magnetic fields generated by a single permanent magnet and a single electromagnetic coil. Alternative embodiments of the invention provide two permanent magnet and electromagnetic coil sets to drive the optical element in two directions of oscillatory motion.

Additional features and advantages of the present invention will be set forth in the description which follows, and in part will be apparent from the description, or may be learned from practice of the invention. The objectives and advantages of the invention will be realized and attained by the apparatus particularly pointed out in the written description and claims hereof, as well as the appended drawings.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

BRIEF DESCRIPTION OF THE DRAWINGS

For a full understanding of the present invention, reference may be had to the following Detailed Description taken in conjunction with the accompanying drawings, in which.

Like reference numerals refer to corresponding parts throughout the several views of the drawings.

DETAILED DESCRIPTION

Figure 1:
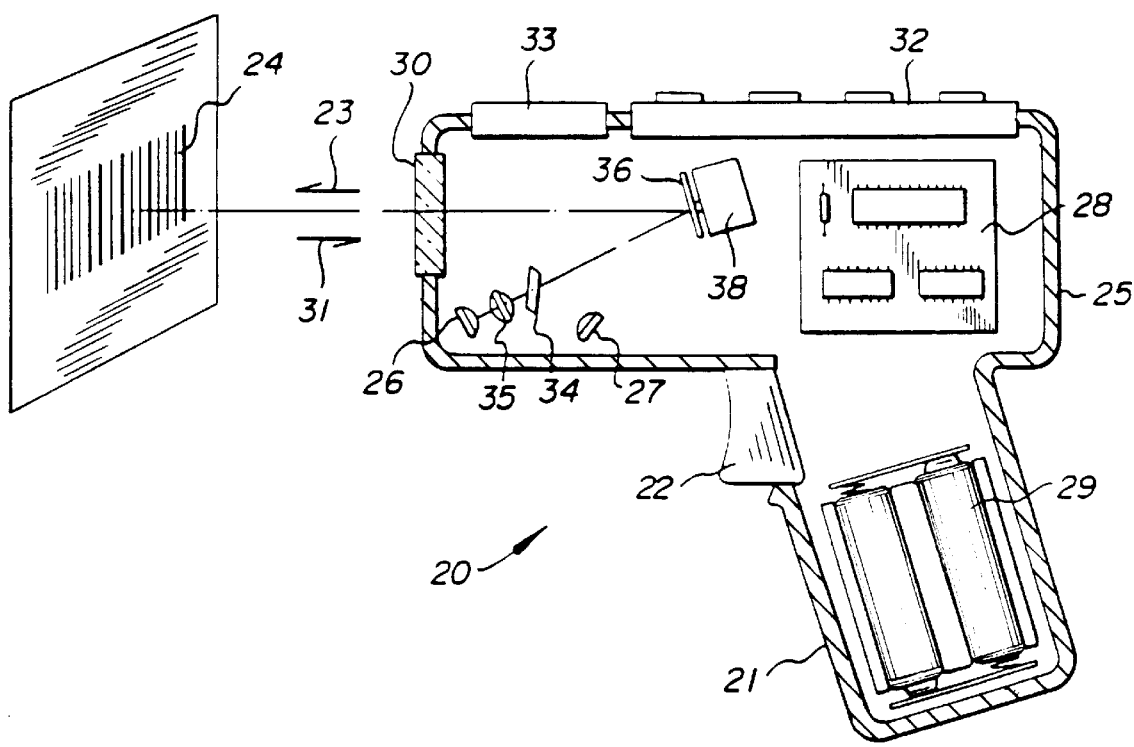
FIG. 1 is a schematic diagram of a handheld optical scanning system for reading a barcode symbol and incorporating a scanner module of the present invention.

FIG. 1 illustrates a portable pistol-shaped scanning system, generally indicated at 20, to which the scanner module of the present invention is particularly suited. Scanning system 20 has a pistol-grip type handle 21, and a manually-actuated trigger switch 22 which allows the user to activate a light beam 23 after the user has positioned the scanning system to a point on a symbol 24. A lightweight plastic housing 25 contains a laser light source 26, detector 27, optics and signal processing circuitry 28, and power source or battery 29.

A light-transmissive window 30 in the front end of housing 25 allows outgoing light beam 23 to exit and incoming reflected light 31 to enter. Scanning system 20 is designed to be aimed at barcode symbol 24 by a user from a position in which the scanning system is spaced from the symbol or moving across the symbol. Typically, this type of handheld scanning system is specified to operate at a range of greater than several inches. Scanning system 20 may also function as a portable computer terminal, and in such embodiments includes a keyboard 32 and a display 33, such as described in the previously noted U.S. Pat. No. 4,409,470.

As further depicted in FIG. 1, a beam splitter 34, or a suitable multiple lens system, may be used to focus the light beam into a scanning spot in an appropriate reference plane at the predetermined location. Light source 26, such as a semiconductor laser diode, is positioned to introduce a light beam along the axis of a lens 35, and the beam passes through partially-silvered, beam splitting mirror 34 and other lenses or beam-shaping structure as needed. The beam is reflected by an oscillating mirror 36 of a scanner module of the present invention, which is generally indicated at 38. The scanner module is energized when trigger 22 is pulled. If the light produced by source 26 is marginally visible, an aiming light may be included in the optical system. The aiming light, if needed, produces a visible-light spot which may be fixed or scanned like the laser beam. A user employs this visible light to aim the scanning system at the symbol before pulling the trigger.

Figure 2:
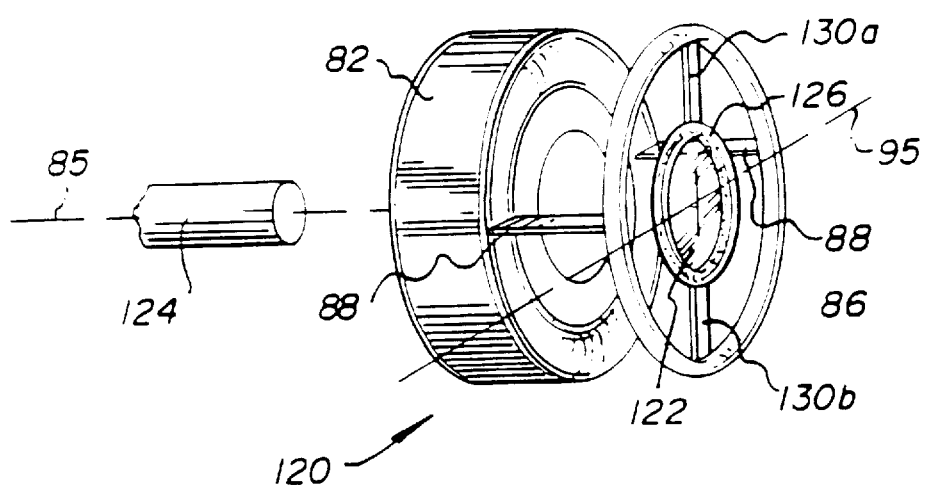
FIG. 2 is a perspective view of a two-directional scanner module constructed in accordance with a fourth embodiment of the invention.

Rather than utilizing an oscillating mirror to produce laser beam scanning, laser beam scanning can be effected utilizing an oscillating lens. Thus, as seen in FIG. 2, a scanner module, generally indicated at 120, utilizes a ring assembly suspension mounting approach. Thus, ring 86 is mounted to vertically oriented electromagnetic coil 82 by a pair of leaf springs 88 at the three and nine o'clock positions. The ring, in turn, mounts a lens 122 whose optical center is aligned with the magnetic axis 85 of electromagnetic coil 82. A laser 124 is positioned to emit a beam along magnetic axis 85 and through lens 122. So as not to obstruct the laser beam, the lens is mounted along its peripheral edge to a ring-shaped permanent magnet 126 and the magnet, in turn, is mounted to ring 86 by a pair of vertically aligned, short, taut band elements 130a and 130b. Taut band element 130a is connected between the twelve o'clock positions of the ring and ring magnet, and taut band element 130b is connected between the six o'clock positions of the ring and ring magnet. The permanent ring magnet is polarized in the horizontal direction, as illustrated, to establish a magnetic axis 95 orthogonal to magnetic axis 85. AC drive current applied to the electromagnetic coil produces X and Y directional oscillations of lens 122, to achieve pre-objective scanning of the laser beam in X and Y directions.

It will be apparent to those skilled in the art that various modifications and variations can be made in the optical scanner module of the present invention without departing from the spirit or scope of the invention. Thus, it is intended that the present invention cover the modifications and variations of this invention provided they come within the scope of the appended claims and their equivalents.

We claim:

1. A scanner module for scanning encoded indicia with light, comprising:

a) a light source for directing a light beam along an optical path;

b) a lens concentrically mounted in the optical path for optically modifying the light beam;

c) a movable assembly for oscillating the lens and moving the light beam in a scan pattern across the encoded indicia, said assembly including a permanent magnet surrounding the optical path for generating a permanent magnetic field and jointly mounted with the lens, a support surrounding the optical path, and means for mounting the permanent magnet and the lens on the support for joint oscillating movement to move the light beam through the lens, the magnet and the support; and d) an energizable electromagnetic coil surrounding the optical path for generating a magnetic field that interacts with said permanent magnetic field to alternatively attract and repel the permanent magnet and the lens to move the light beam through the coil.

2. The module according to claim 1, wherein the lens is a focusing lens for focusing the light beam to a spot at a distance from the module.

3. The module according to claim 2, wherein the focusing lens has an optical center lying on the optical path.

4. The module according to claim 1, wherein the permanent magnet is annular and surrounds the lens.

5. The module according to claim 4, wherein the mounting means includes a first pair of co-linear taut spring elements extending along a first axis, each spring element having one end connected to the permanent magnet, and an opposite end connected to the support.

6. The module according to claim 1, wherein the support is an annular frame, and wherein the lens and the permanent magnet are centrally mounted within the frame.

7. The module according to claim 1, wherein the light source is a laser.

8. The module according to claim 5, wherein the first axis is generally normal to the optical path.

9. The module according to claim 1, wherein the coil has an annular shape and a passage extending therethrough along the optical path, and wherein the permanent magnet has an annular shape and is concentric with the optical path.

10. The module according to claim 5, wherein the mounting means includes a second pair of taut spring elements extending between the support and the coil along directions parallel to the optical path.

11. The module according to claim 10, wherein each spring element is a generally planar leaf spring.

12. The module according to claim 11, wherein the first pair of spring elements lie in a first plane, and wherein the second pair of spring element lie in a second plane generally normal to the first plane.

* * * * *